United States Patent [19]

Kuwajima et al.

[11] Patent Number: 4,770,772

[45] Date of Patent: Sep. 13, 1988

[54] APPARATUS FOR SEPARATING AND DRYING FINE PARTICLES

[75] Inventors: Soichi Kuwajima, Urawa; Shiro Fujii, Kawaguchi; Takeo Saeki, Tama, all of Japan

[73] Assignee: Nihon Schumacher Kabushiki Kaisha, Shibuya, Japan

[21] Appl. No.: 114,425

[22] Filed: Oct. 28, 1987

[30] Foreign Application Priority Data

Oct. 31, 1986 [JP] Japan .................... 61-260447

[51] Int. Cl.⁴ .................................. B01D 23/00
[52] U.S. Cl. .................................. 210/184; 210/402; 210/408; 210/409; 210/413; 210/415
[58] Field of Search ............... 210/178, 179, 184, 408, 210/409, 413, 415, 402; 34/126

[56] References Cited

U.S. PATENT DOCUMENTS 3,401,923  9/1968  Bearce ............................ 34/126
3,441,141  4/1969  Zimmermann et al. ......... 210/408
4,002,559  1/1977  Paterson et al. ................ 210/415

Primary Examiner—Peter Chin
Attorney, Agent, or Firm—Ladas & Parry

[57] ABSTRACT

Apparatus has a rotary drum provided with a heating jacket therearound. The drum is mounted on a base pivotally supported on a pedestal. The base can be caused to take different orientations so as to enable the drum to take different attitudes. While the drum is in a vertical position, a mixture of fine particles and a liquid is supplied into the drum through a supply passage formed axially in a rotary shaft which extends into the drum rotatably and axially slidably relative to the drum. The mixture is filtered through a filter disposed in the drum. Filter liquid is discharged to the outside. The particles are prevented from passing through the filter and remain in the drum. Thereafter, the particles are heated and dried by a heating jacket on the drum while the drum is caused to assume a horizontal position and being rotated. The drum is then inclined such that the initially upwardly directed end thereof is directed obliquely downward. Thereafter, an agitating blade and sweeping blades on the inner end of the rotary shaft is rotated and shifted axially, whereby the dried particles are agitated and swept, to be discharged to the outside.

7 Claims, 2 Drawing Sheets

APPARATUS FOR SEPARATING AND DRYING FINE PARTICLES

BACKGROUND OF THE INVENTION

The present invention relates to an apparatus for separating by filtration fine particles from a liquid and drying the separated fine particle.

In processes for capturing by filtration fine particles contained in solvents such as alcohols, hexane, and acetone, and separating these particles followed by drying, when the operations of capturing, separating and drying are carried out in separate processes, there is a danger of explosion because of low boiling points of the solvents.

However, when conventional filtering apparatus is used, there is a difficulty in avoiding the above mentioned danger of explosion and the efficiency of treatment is poor, because the conventional apparatus does not allow continuous operations of filtration, separation and drying, and therefore requires shift of the operation from one process to another during the processing.

SUMMARY OF THE INVENTION

Taking the above problems into consideration, the principal object of the invention is to provide an apparatus for separating and drying fine particles, capable of carrying out a series of operations of liquid removal, filtration, and particle drying and withdrawal in the same apparatus.

For attaining the above object, the apparatus according to the present invention comprises: a rotary drum having a rotation axis; base means for mounting the rotary drum rotatably about said rotation axis, said base means being movable angularly to cause said rotary drum to assume different attitude; drive means for rotating said rotary drum about the rotation axis; a rotary shaft extending into said rotary drum coaxially therewith in a manner rotatable and axially slidable relative to the drum, said rotary shaft having fixed thereto blade means for agitating and sweeping the fine particles within the rotary drum; drive means for rotating said rotary shaft; means for moving said rotary shaft in axial sliding motion; passage means for introducing therethrough a mixture of a liquid and the fine particles into the rotary drum; filter means for the rotary drum for separating the fine particles from said mixture introduced into the rotary drum and causing the particles to remain within the drum while allowing the liquid to pass therethrough; heating means on the rotary drum for heating and thus drying the particles remaining within the drum; liquid outlet means provided on the rotary drum for discharge of the liquid which has passed through said filter means; and particle outlet means provided on the rotary drum for discharge of the particles dried by said heating means from within the drum.

With the above mentioned organization, the operation of the apparatus is carried out as follows. While the rotary drum and hence the filter means assume an attitude adapted for filtration, a predetermined amount of the liquid to be filtered is filled into the rotary drum through the passage means. Filtration is carried out while the internal pressure of the rotary drum is kept constant, and the filtrate is discharged from the liquid outlet means. Fine particles arrested from the liquid by the filter means are dried uniformly while being moved relative to the inner wall surface of the rotary drum as the latter is being rotated. At this time, the heater means heats the particles, and the dried particles are then discharged through the particle outlet as the rotary drum and the sweeping blades are rotated, respectively.

According to the present invention, a series of processes from separation by filtration of fine particles contained in the liquid to their drying can be carried out continuously without interrupting the processes between one process and another. Consequently there is no danger. Since fine particles are dried while moving along the inner wall surface of the rotary drum being rotated, the fine particles are dried evenly in a short time period. In addition, fine particles adhering to the inner wall surface of the rotary drum are dried and swept away therefrom by the sweeping blade means and withdrawn after being dried. Thus, the present apparatus can carry out separation and drying safely and with high efficiency.

The above and other features and advantages of the present invention will become apparent from a study of the following description with reference to the accompanying drawings.

DETAILED DESCRIPTION OF THE INVENTION

Figure 1:
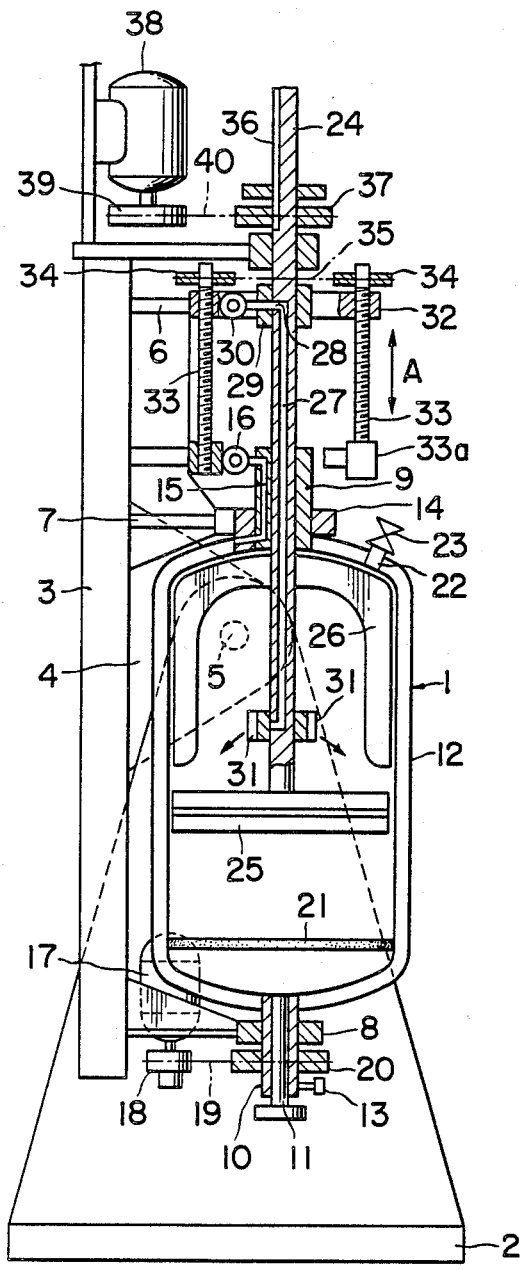
FIG. 1 is an elevation, partly in section, of an apparatus for separating and drying fine particles according to the present invention.
Figures 2, 3:
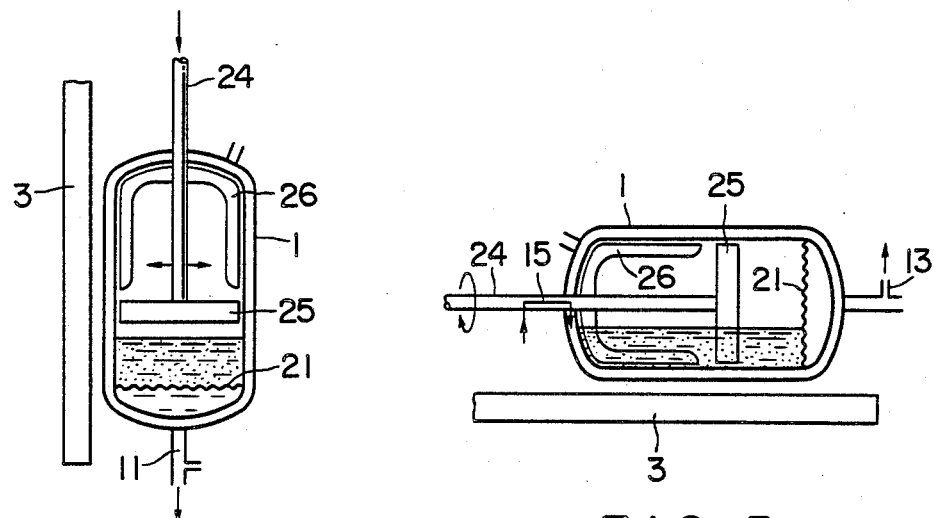
FIG. 2 is a fragmentary view of the apparatus of FIG. 1, showing a state in which filtering operation is being carried out.
FIG. 3 is a fragmentary view of the apparatus, showing a state in which drying operation is being carried out.
Figure 4:
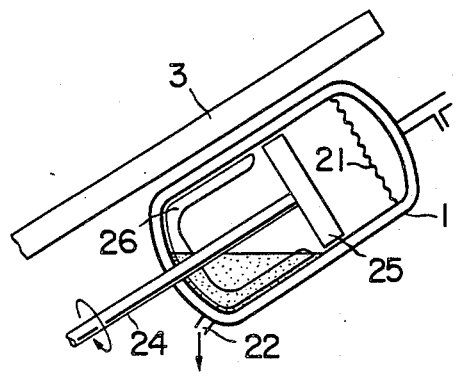
FIG. 4 is a fragmentary view of the apparatus, showing a state in which sweeping operation is being carried out.

An embodiment of the present invention will now be described with reference to the drawings. FIG. 1 shows, in elevation, the apparatus of the present invention having a rotary drum 1 of cylindrical shape. As will be described later, the drum 1 can take a vertical position (filtering position) as shown in FIG. 1, a horizontal position (drying position) as shown in FIG. 3, or an inclined position (dried fine particle discharging position) as shown in FIG. 4.

An intermediate portion of a rotatable base 3 with respect to its lengthwise direction is mounted rotatably by means of a pivot pin 5 through a bracket 4 fixed thereto on the top of a pedestal 2 fixed to the floor. Bearings 6, 7 and 8 are fixedly secured to that side of the base 3 to which the bracket 4 is provided. Hollow shafts 9 and 10 fixed to both ends of the rotary drum 1 are supported rotatably by the bearings 7 and 8, respectively.

The end of the hollow shaft 10 which is at the lower side when the rotary drum 1 takes the vertical position as shown in FIG. 1 serves as a liquid outlet 11 to discharge liquid in the drum 1. The rotary drum is provided on the outer surface thereof with a heating medium chamber or jacket 12 into which heating medium such as steam or hot water can be introduced. A heating medium outlet 13 is provided at the side of the hollow shaft 10, the outlet being in communication with the interior of the jacket 12. At the position of the bearing 7 which is on the top side when the rotary drum 1 is in the vertical position, a heating medium inlet 16 is provided so as to communicate with the interior of the jacket 12 through a heating medium passage 15 so that a heating medium can be supplied through a rotary joint 14 into the interior of the jacket 12.

The hollow shaft 10 of the rotary drum 1 is adapted to be rotated through transmission means such as a pulley 18, a belt 19, and a pulley 20, from a motor 17 for rotating the drum 1 which is mounted on the rotary base 3 as described hereinbefore.

A filter medium 21 is fixed in the interior of the rotary drum 1 which medium is on the lower side when the drum is in the vertical position. An outlet 22 is provided at the shoulder on the upper side of the rotary drum 1 in order to discharge dried fine particles, the outlet 22 being provided with a valve 23.

On the other hand, a rotary shaft 24 is inserted rotatably and longitudinally slidably from the upper side of the rotary drum 1 in the vertical position into and through the hollow shaft 9. The rotary shaft 24 has fixed to the lower end thereof as viewed in FIG. 1 stirring or agitating blades 25, and fixed to a position halfway thereof blades 26 for sweeping out fine particles within the drum 1, the blades 26 being shaped to extend along the inner peripheral surface and the inner end surface of the rotary drum 1.

The rotary shaft 24 has the upper end projecting outside of the rotary drum 1, which shaft is supported rotatably and slidably by the bearing 6 on the rotatable base 3. A liquid passage 27 is formed in and along the center of the rotary shaft 24. An inlet 28 to the liquid passage 27 is always in communication with a liquid supply passage 30 through a rotary joint 29 fitted on the rotary shaft 24. Liquid outlets 31 communicating with the passage 27 open near the inner end of the rotary shaft 24.

A support base 32 for the rotary joint 29 has screw shafts 33 screwed therein one ends of which are mounted rotatably on a member 33a fixed to the base 3. Chain wheels 34 are fixed to the other ends of the screw shafts 33, and a chain 35 for transmitting rotation from a driving motor (not shown) to the rotary shaft is passed around the chain wheels 34. When the screw shafts 33 are rotated by operating said motor, the support base 32 is moved in the direction of arrow A, whereby the rotary shaft 24 is moved in its longitudinal direction. The moving means for the rotary shaft 24 based on rotation of the screw shafts 33 may be replaced by a pneumatic cylinder, etc.

A spline or key groove 36 is formed in the axial direction at the outerend part of the rotary shaft 24, on which a sprocket wheel 37 is mounted slidably but rotatably with the rotary shaft 24. Rotation is transmitted from a motor 38 for driving the rotary shaft 24 through a sprocket wheels 39, a chain 40 to the sprocket wheel 37.

Operation of the apparatus as described in the foregoing will be explained below. In a filtration process, the rotatable base 3 is brought into the vertical position as shown in FIGS. 1 and 2 so that the rotary drum 1 is in the vertical position shown in these figures, whereby the filter medium 21 is set in a horizontal position shown. A predetermined amount of the liquid to be treated, which contains fine particles, is then supplied through the liquid supply passage 30 and the liquid passage 27 and filled in the rotary drum 1. Thereafter, a pressurized gas is supplied into the rotary drum 1 through the liquid supply passage 30 from a pressurized gas source (not shown) to raise the pressure inside the rotary drum 1 to a predetermined value, under which the filtration is carried out. The liquid or filtrate which has passed downward through the filter medium 21 is recovered through a piping connected to the liquid outlet 11 as shown in FIG. 2, and fine particles contained in the liquid having been subjected to the filtration operation are arrested by the filter medium 21.

On completion of the filtration operation, the rotatable base 3 is rotated through 90° by operating a motor (not shown) to bring the rotary drum 1 into a horizontal position shown in FIG. 3. The motor 17 is then started to rotate the rotary drum 1, while, for drying by heating, a heating medium such as steam is introduced from the heating medium inlet 16 through the passage 15 into the heating medium chamber or jacket 12 on the outer surface of the rotary drum 1, the interior of which is heated thereby. As a result, fine particles in the rotary drum are dried while moving relative to its inner wall surface as it rotates. After completion of heat exchange, the heating medium is taken out through the heating medium outlet 13 as shown in FIG. 3.

On completion of the drying of fine particles, the rotatable base 3 is further rotated to bring the rotary drum 1 into an inclined position in which its initially uppermost part is directed obliquely downward as shown in FIG. 4. The motor 38 is then started to rotate the rotary shaft 24, and the stirring or agitating blade 25 and the fine particle sweeping blades 26 are turned, whereby fine particles in the rotary drum 1 are agitated and swept down along the inner side wall surface of the rotary drum 1. It follows that the fine particles thus dried and swept are discharged by opening the valve 23 of the outlet 22 as shown in FIG. 4. In this case, fine particles adhering to the inner side wall surface of the rotary drum 1 can be discharged thoroughly by continuing the rotation of the drum.

The apparatus has been described as having a cylindrical rotary drum 1, but the drum may take the form of a conical drum having a normally horizontal center axis in order to provide smoother movements of fine particles when they are being dried in the drum. In this case, the filter medium 21 is arranged on the circumferential wall of the drum along a circumference of the drum so that the liquid can be discharged through the circumferential filter medium. The rotary drum 1 may also be spherical. In this case it becomes unnecessary to turn the drum through 90° when shifting from the filtering process to the drying processes, and hence the processes from the separation by the filtration to the drying of fine particles can be carried out while the drum is being kept in the same attitude. It will be apparent that this serves for simplification of the apparatus.

What is claimed is:

1. Apparatus for separating fine particles from a liquid and drying the particles, comprising:
    a rotary drum having a rotation axis;
    base means for mounting the rotary drum rotatably about said rotation axis, said base means being movable angularly to cause said rotary drum to assume different attitude;
    drive means for rotating said rotary drum about the rotation axis;
    a rotary shaft extending into said rotary drum coaxially therewith in a manner rotatable and axially shiftable relative to the drum, said rotary shaft having fixed thereto blade means for agitating and sweeping the fine particles within the rotary drum;

drive means for rotating said rotary shaft;

means for moving said rotary shaft in axial sliding motion;

passage means for introducing therethrough a mixture of a liquid and the fine particles into the rotary drum;

filter means for the rotary drum for separating the fine particles from said mixture introduced into the rotary drum and causing the particles to remain within the drum while allowing the liquid to pass therethrough;

heating means on the rotary drum for heating and thus drying the particles remaining within the drum;

liquid outlet means provided on the rotary drum for discharge of the liquid which has passed through said filter means; and particle outlet means provided on the rotary drum for discharge of the particles dried by said heating means from within the drum.

2. Apparatus as claimed in claim 1 wherein said base means is mounted through a pivot shaft on a pedestal in a manner pivotable about the pivot shaft.

3. Apparatus as claimed in claim 1 wherein said blade means comprises agitating blade fixed to the inner end part of the rotary shaft, and sweeping blade extending closely along parts of the inner surface wall of the drum.

4. Apparatus as claimed in claim 1 wherein said passage means extends in the rotary shaft axially thereof.

5. Apparatus as claimed in claim 1 wherein said filter means is provided in the drum thereacross so as to divide the interior of the drum into two chambers, said blade means being in one of the chambers, said liquid outlet means being in communication with the other chamber.

6. Apparatus as claimed in claim 1 wherein said heating means is a jacket on the outer wall of the drum through which jacket heating medium is passed.

7. Apparatus as claimed in claim 1 wherein said drive means for the rotary drum and rotary shaft and means for moving the rotary shaft axially are mounted on the base means.

* * * * *